United States Patent
Krishnan Gorumkonda et al.

(10) Patent No.: US 12,468,395 B2
(45) Date of Patent: Nov. 11, 2025

(54) FINGER GESTURE RECOGNITION VIA ACOUSTIC-OPTIC SENSOR FUSION

(71) Applicant: Snap Inc., Santa Monica, CA (US)

(72) Inventors: Gurunandan Krishnan Gorumkonda, Kirkland, WA (US); Shree K. Nayar, New York, NY (US); Chenhan Xu, North Bergen, NJ (US); Bing Zhou, Rye, NY (US)

(73) Assignee: SNAP INC., Santa Monica, CA (US)

( * ) Notice: Subject to any disclaimer, the term of this patent is extended or adjusted under 35 U.S.C. 154(b) by 64 days.

(21) Appl. No.: 18/368,358

(22) Filed: Sep. 14, 2023

(65) Prior Publication Data

US 2024/0094824 A1 Mar. 21, 2024

Related U.S. Application Data

(60) Provisional application No. 63/375,743, filed on Sep. 15, 2022.

(51) Int. Cl.
| | | |
|---|---|---|
| *G06F 3/01* | (2006.01) | |
| *G06F 3/16* | (2006.01) | |
| *G06V 40/10* | (2022.01) | |
| *G06V 40/20* | (2022.01) | |

(52) U.S. Cl.
CPC ............ *G06F 3/017* (2013.01); *G06F 3/16* (2013.01); *G06V 40/10* (2022.01); *G06V 40/28* (2022.01)

(58) Field of Classification Search
None
See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,856,691 B2 | 10/2014 | Geisner et al. | |

(Continued)

FOREIGN PATENT DOCUMENTS

| | | |
|---|---|---|
| CN | 103049761 B | 8/2016 |
| CN | 119866483 A | 4/2025 |

(Continued)

OTHER PUBLICATIONS

"U.S. Appl. No. 17/941,435, Notice of Allowance mailed Jun. 12, 2023", 8 pgs.

(Continued)

*Primary Examiner* — Tuan S Nguyen
(74) *Attorney, Agent, or Firm* — SCHWEGMAN LUNDBERG & WOESSNER, P.A.

(57) ABSTRACT

A finger gesture recognition system is provided. The finger gesture recognition system includes one or more audio sensors and one or more optic sensors. The finger gesture recognition system captures, using the one or more audio sensors, audio signal data of a finger gesture being made by a user, and captures, using the one or more optic sensors, optic signal data of the finger gesture. The finger gesture recognition system recognizes the finger gesture based on the audio signal data and the optic signal data and communicates finger gesture data of the recognized finger gesture to an Augmented Reality/Combined Reality/Virtual Reality (XR) application.

20 Claims, 12 Drawing Sheets

(56) References Cited

U.S. PATENT DOCUMENTS

| | | | |
|---|---|---|---|
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,591,730 | B2 | 3/2020 | Rodriguez, II et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,366,529 | B1 | 6/2022 | Reynolds |
| 11,531,402 | B1 | 12/2022 | Stolzenberg |
| 11,546,505 | B2 | 1/2023 | Canberk |
| 2009/0012788 | A1 | 1/2009 | Gilbert et al. |
| 2011/0050562 | A1 | 3/2011 | Schoen et al. |
| 2011/0301934 | A1 | 12/2011 | Tardif |
| 2014/0171036 | A1 | 6/2014 | Simmons |
| 2015/0120293 | A1 | 4/2015 | Wohlert et al. |
| 2015/0220149 | A1* | 8/2015 | Plagemann ............. G06F 3/017 715/856 |
| 2015/0370320 | A1 | 12/2015 | Connor |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0158370 | A1 | 6/2018 | Pryor |
| 2019/0096130 | A1* | 3/2019 | Shim ...................... G06F 3/011 |
| 2019/0146219 | A1 | 5/2019 | Rodriguez, II |
| 2021/0011612 | A1 | 1/2021 | Dancie et al. |
| 2021/0074016 | A1 | 3/2021 | Li et al. |
| 2021/0109598 | A1* | 4/2021 | Zhang .................... G06F 3/015 |
| 2021/0124417 | A1* | 4/2021 | Ma ......................... G06F 3/015 |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0301231 | A1 | 9/2022 | Eirinberg et al. |
| 2022/0326781 | A1 | 10/2022 | Hwang et al. |
| 2022/0334649 | A1 | 10/2022 | Hwang et al. |
| 2022/0375174 | A1 | 11/2022 | Arya et al. |
| 2023/0154134 | A1* | 5/2023 | Oh ......................... G06V 20/20 382/103 |

FOREIGN PATENT DOCUMENTS

| | | |
|---|---|---|
| EP | 3707693 A1 | 9/2020 |
| EP | 4172726 A1 | 5/2023 |
| EP | 4172730 A1 | 5/2023 |
| KR | 20220158824 A | 12/2022 |
| WO | WO-2016168591 A1 | 10/2016 |
| WO | WO-2019094618 A1 | 5/2019 |
| WO | WO-2022005687 A1 | 1/2022 |
| WO | WO-2022005690 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2024059182 A1 | 3/2024 |

OTHER PUBLICATIONS

"International Application Serial No. PCT/US2023/032717, International Preliminary Report on Patentability mailed Mar. 27, 2025", 8 pgs.

"International Application Serial No. PCT/US2023/032717, International Search Report mailed Nov. 9, 2023", 4 pgs.

"International Application Serial No. PCT/US2023/032717, Written Opinion mailed Nov. 9, 2023", 6 pgs.

* cited by examiner

FINGER GESTURE RECOGNITION VIA ACOUSTIC-OPTIC SENSOR FUSION

PRIORITY CLAIM

This application claims the benefit of priority of U.S. Provisional Patent Application No. 63/375,743, filed Sep. 15, 2022, which is hereby incorporated by reference herein in its entirety.

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term extended Reality (XR) refers to augmented reality, virtual reality and any hybrids of these technologies unless the context indicates otherwise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
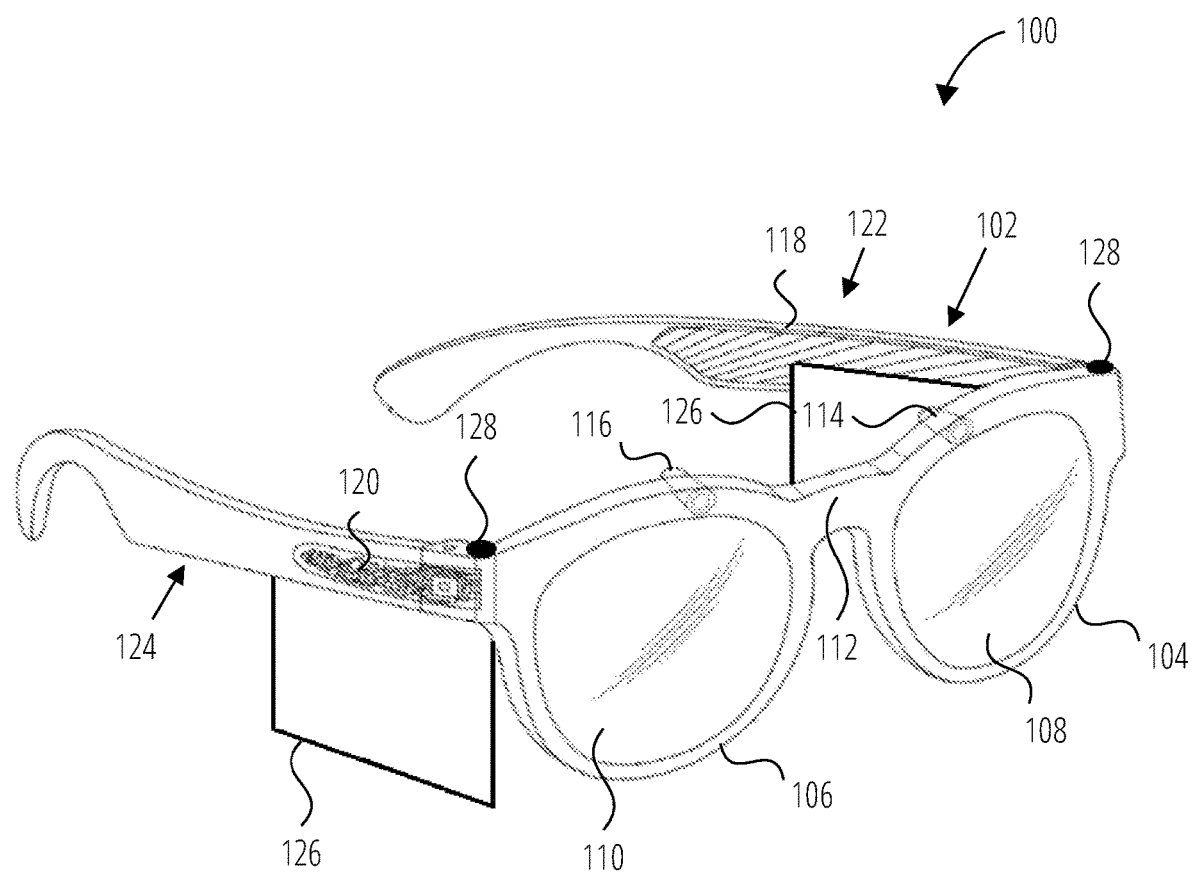
FIG. 1 is a perspective view of a head-worn device, in accordance with some examples.

Finger gesture recognition is a user input modality for user interaction with AR/VR applications since it is natural to perform finger gestures and gives a user an immersive experience. Recent years have witnessed the explosion of XR (i.e., AR, VR, and Mixed Reality) applications that dramatically improve productivity and user experiences in many scenarios (e.g., remote collaboration, design, entertainment, etc.). While the interactable space is extended freely to the reachable range, the XR interaction is still limited and requires a large effort from users. Users need to lift their hands to reach either a small 2D on-device touch surface or a limited Line-of-Sight space covered by the Field-of-View of the head-mount tracking camera. Or users hold monopolizing controllers and remember the corresponding operation of each button.

Wrist-worn XR input device may provide natural and low-effort XR interactions as the wrist-worn XR input device can follow hands continuously without hand grasping to capture gesture interaction. Some wrist-worn XR input devices infer finger gestures by directly sensing part of the hand from wrist (e.g., palm and back of hands). The modalities used in this type of solution can directly sense part of the hand, but the gesture inference requires a large part of hand to be visible, which results in lifted off-wrist sensors that are uncomfortable to wear or multiple cameras consuming large amounts of computational resources. Other wrist-worn XR devices infer finger gestures by capturing gesture-induced physiological signal on wrist, including wrist deformation, wrist muscle electrical activities, wrist inertia. Such user input modalities have integral information of finger gestures compared with other modalities. Nevertheless, these modalities are complicated and prone to be disturbed (e.g., capacitance and EMG), leading to a limited granularity. In addition, such wrist-worn XR input device are usually limited to tens of gestures.

In some examples, a finger gesture recognition system provides for fine-grained gesture recognition. The finger gesture recognition system is built upon high-speed low-power optic motion sensors and a modified audio sensor. The optic sensors capture motion of hand muscles and the audio sensor is sensitive to the motion of tendons. This results in advantages for gesture recognition in XR applications in that the finger gesture recognition system is lightweight as the fine-grained gesture sensing is achieved with a small number of small form-factor sensors and finger gesture recognition is efficient as it does not rely on a deep learning model.

In some examples, a hands-free fine-grained finger gesture recognition system uses audio and optic sensors in a form of a wristband-based XR input device. The finger gesture recognition system comprises a sensor fusion network of audio and optic signals. The finger gesture recognition system includes a wristband with audio sensors and high-speed low-power optic motion sensors to capture in real-time audio and optic signals from a user while the user performs finger gestures when interacting with an AR/VR application. The finger gesture recognition system recognizes a set of finger gestures that can be reliably detected from complementary signals generated by audio and optic sensors and are natural to perform by a user.

In some examples, the finger gesture recognition system uses a multi-modal CNN-transformer-based model for discrete gesture recognition, which includes flick, pinch, and tap. The finger gesture recognition system detects contact between thumb and index through a contact detection model and tracks thumb-swiping gestures continuously in real-time to enable fine-grained control.

In some examples, the finger gesture recognition system is suitable for integration into existing wrist-worn devices such as smartwatches or fit bands.

A finger gesture recognition system in accordance with some examples of the present disclosure features:

A defined set of finger gestures.

A multi-modal CNN-Transformer model for window level signal classification.

An aggregation model for robust gesture detection.

A level design to suppress false alarms.

Other technical features may be readily apparent to one skilled in the art from the following figures, descriptions, and claims.

FIG. 1 is a perspective view of a head-worn AR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing system, such as a computer 120, which can be of any suitable type so as to be carried by the frame 102 and, in one or more examples, of a suitable size and shape, so as to be partially disposed in one of the temple piece 122 or the temple piece 124. The computer 120 can include multiple processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 902 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene environment scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
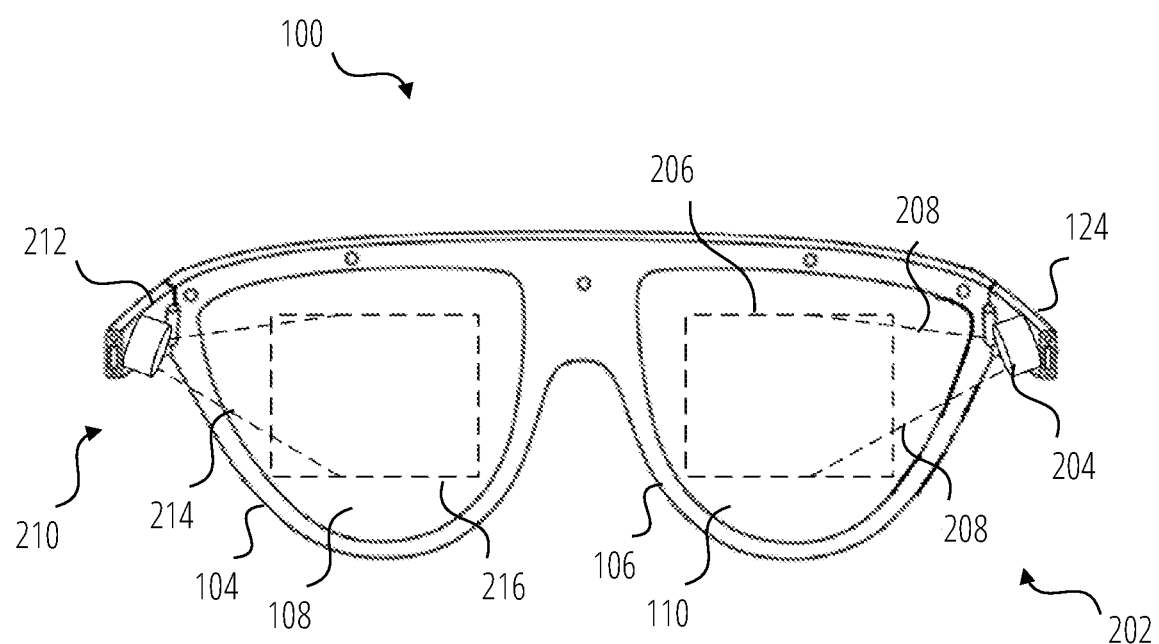
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene environment seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene environment seen by the user. The combination of a GPU, the forward optical assembly 202, the left optical element 108, and the right optical element 110 provide an optical engine of the glasses 100. The glasses 100 use the optical engine to generate an overlay of the real-world scene environment view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 926 illustrated in FIG. 9), and/or hand movements, locations, and positions detected by the glasses 100.

In some examples, the glasses 100 comprise a stand-alone AR system that provides an AR experience to a user of the glasses 100. In some examples, the glasses 100 are a component of an AR system that includes one or more other devices providing additional computational resources and or additional user input and output resources. The other devices may comprise a smart phone, a general purpose computer, or the like.

Figure 3:
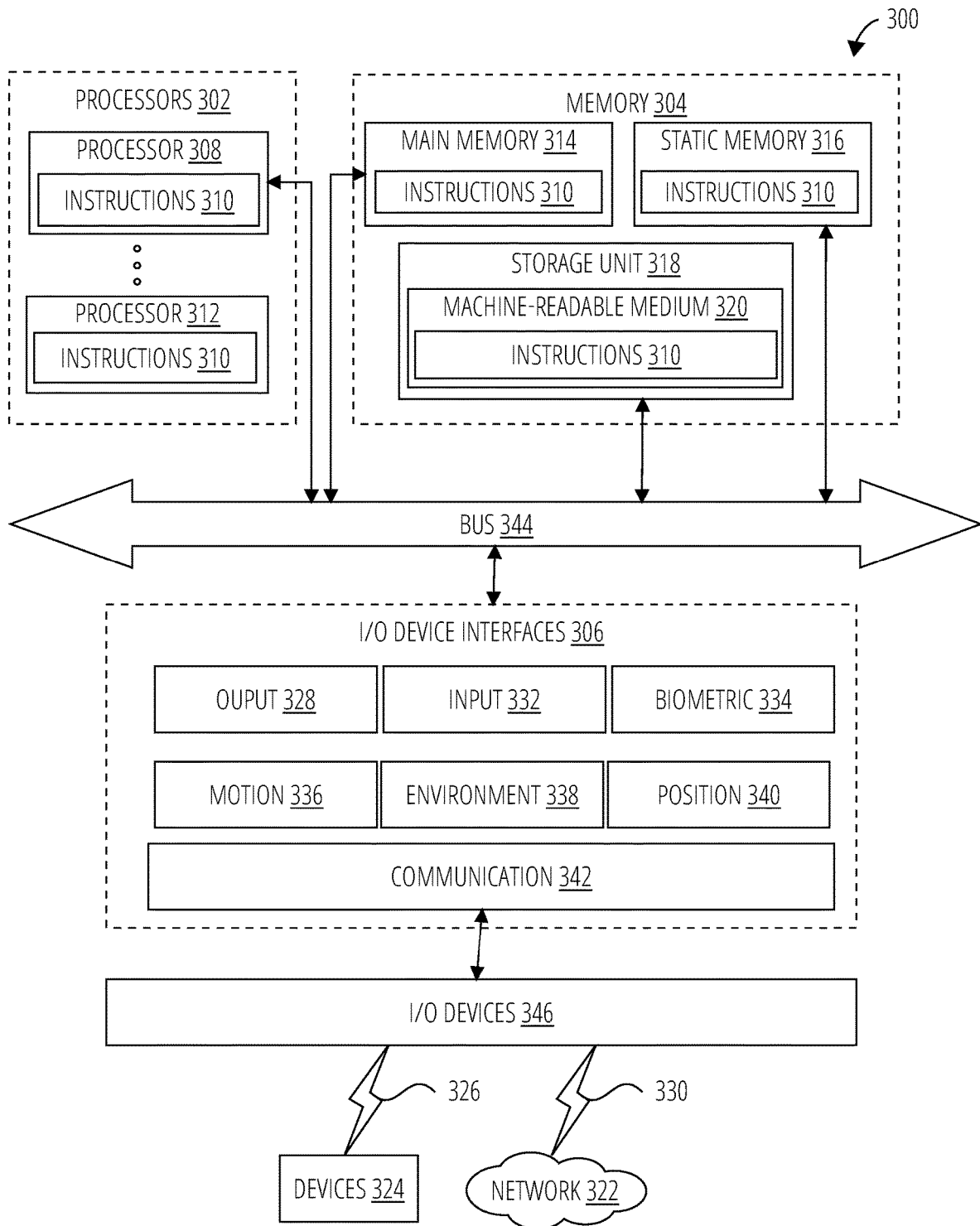
FIG. 3 is a diagrammatic representation of a machine within which a set of instructions may be executed for causing the machine to perform any one or more of the methodologies discussed herein in accordance with some examples.

FIG. 3 is a diagrammatic representation of a machine 300 within which instructions 310 (e.g., software, a program, an application, an applet, an app, or other executable code) for causing the machine 300 to perform any one or more of the methodologies discussed herein may be executed. The machine 300 may be utilized as a computer 120 of an AR system such as glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 in conjunction with other components of the AR system may function as, but not is not limited to, a server, a client, computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O device interfaces 306, which may be configured to communicate with one another via a bus 344. In an example, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within a non-transitory machine-readable medium 320 within the storage unit 318, within one or more of the processors 302 (e.g., within the processor's cache memory), or any suitable combination thereof, during execution thereof by the machine 300.

The I/O device interfaces 306 couple the machine 300 to I/O devices 346. One or more of the I/O devices 346 may be a component of machine 300 or may be separate devices. The I/O device interfaces 306 may include a wide variety of interfaces to the I/O devices 346 used by the machine 300 to receive input, provide output, produce output, transmit information, exchange information, capture measurements, and so on. The specific I/O device interfaces 306 that are included in a particular machine will depend on the type of machine. It will be appreciated that the I/O device interfaces 306 the I/O devices 346 may include many other components that are not shown in FIG. 3. In various examples, the I/O device interfaces 306 may include output component interfaces 328 and input component interfaces 332. The output component interfaces 328 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 332 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O device interfaces 306 may include biometric component interfaces 334, motion component interfaces 336, environmental component interfaces 338, or position component interfaces 340, among a wide array of other component interfaces. For example, the biometric component interfaces 334 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion component interfaces 336 may include interfaces to inertial measurement units (IMUs), acceleration sensor components (e.g., accelerometer), gravitation sensor components, rotation sensor components (e.g., gyroscope), and so forth. The environmental component interfaces 338 may include, for example, interfaces to illumination sensor components (e.g., photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position component interfaces 340 include interfaces to location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O device interfaces 306 further include communication component interfaces 342 operable to couple the machine 300 to a network 322 or devices 324 via a coupling 330 and a coupling 326, respectively. For example, the communication component interfaces 342 may include an interface to a network interface component or another suitable device to interface with the network 322. In further examples, the communication component interfaces 342 may include interfaces to wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication component interfaces 342 may include interfaces to components operable to detect identifiers. For example, the communication component interfaces 342 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication component interfaces 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
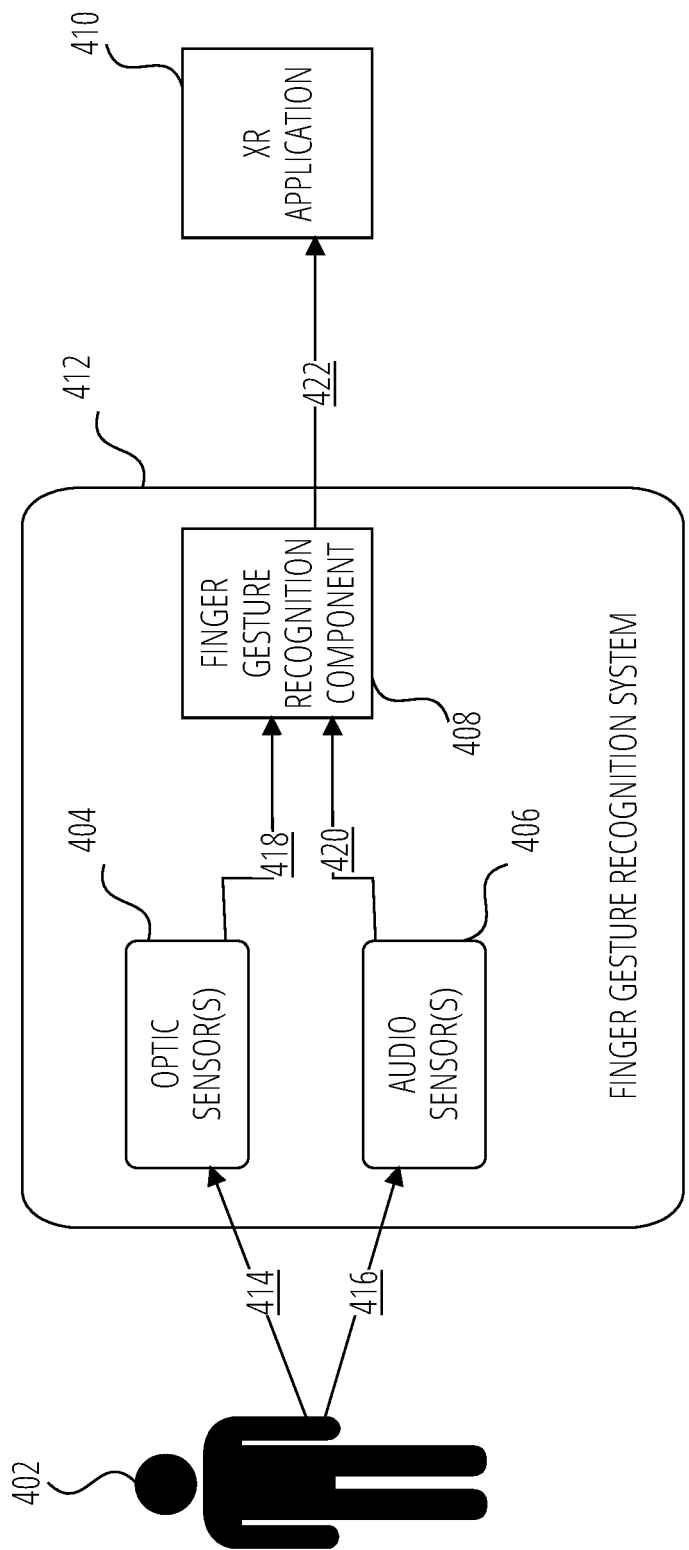
FIG. 4 is an illustration of a finger gesture recognition system in accordance with some examples of the present disclosure.

FIG. 4 is an illustration of a finger gesture recognition system in accordance with some examples of the present disclosure. A finger gesture recognition system 412 is used by a computing system to provide a user input modality to a user 402 when interacting with an XR application 410. The finger gesture recognition system 412 comprises one or more optic sensors 404 and one or more audio sensors 406. The finger gesture recognition system 412 uses the one or more optic sensors 404 and the one or more audio sensors 406 to capture optically detectable finger gesture components 414 and audibly detectable finger gesture components 416, respectively, of finger gesture movements (as more fully described in reference to FIG. 5) being made by the user 402 while the user 402 interacts with the XR application 410 (as more fully described in reference to FIG. 6A, FIG. 6B, and FIG. 6C).

The one or more optic sensors 404 generate optic signal data 418 and communicates the optic signal data 418 to a finger gesture recognition component 408. The one or more audio sensors 406 generate audio signal data 420 and communicate the audio signal data 420 to the finger gesture recognition component 408. The finger gesture recognition component 408 receives the optic signal data 418 and the audio signal data 420 and detects the finger gestures being made the user 402 based on the optic signal data 418 and the audio signal data 420 (as more fully described in reference to FIG. 7A and FIG. 7B). The finger gesture recognition component 408 communicates the detected finger gestures as detected finger gesture data 422 to the XR application 410. The XR application 410 receives the detected finger gesture data 422 and uses the detected finger gesture data 422 as user input into an XR user interface being provided to the user 402 by the XR application 410.

Figure 5:
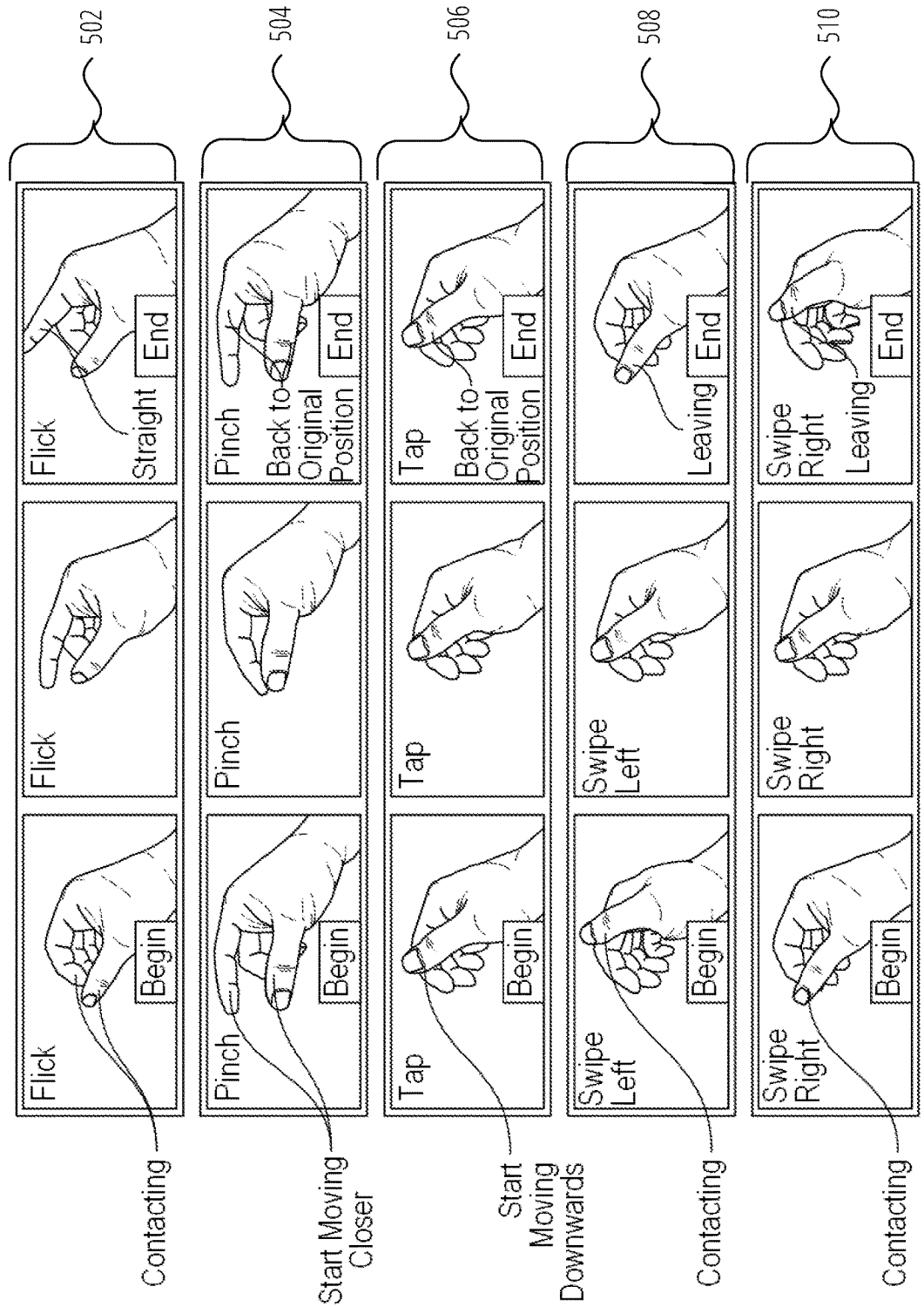
FIG. 5 is an illustration of a set of finger gestures in accordance with some examples of the present disclosure.

FIG. 5 is an illustration of a set of finger gestures in accordance with some examples of the present disclosure. The finger gestures are natural to perform for most users, and they are naturally mapped to control signals for XR input device such as click and swipe. In addition, these gestures are designed based on sensor signal properties. Specifically, a flick finger gesture 502, a pinch finger gesture 504, a tap finger gesture 506, a swipe left finger gesture 508, and a swipe right finger gesture 510 are illustrated. Each gesture is a sequence of finger movements with a defined start and end state of the fingers for data labelling. These definitions allow gestures to be labelled consistently among all sessions labelled by different users.

The finger gestures are separated into categories: fast gestures (i.e., the flick finger gesture 502, the pinch finger gesture 504, and the tap finger gesture 506); and slow/continuous gestures (i.e., the swipe left finger gesture 508 and the swipe right finger gesture 510). Fast gestures involves faster finger movements and incurs high impact in audio signals, and usually they have short duration. Slow gestures like swiping involve continuous movement and usually last longer duration. Additionally, a finger gesture recognition system tracks continuous swiping left and right finger gestures precisely for fine-grained control.

Figure 6A:
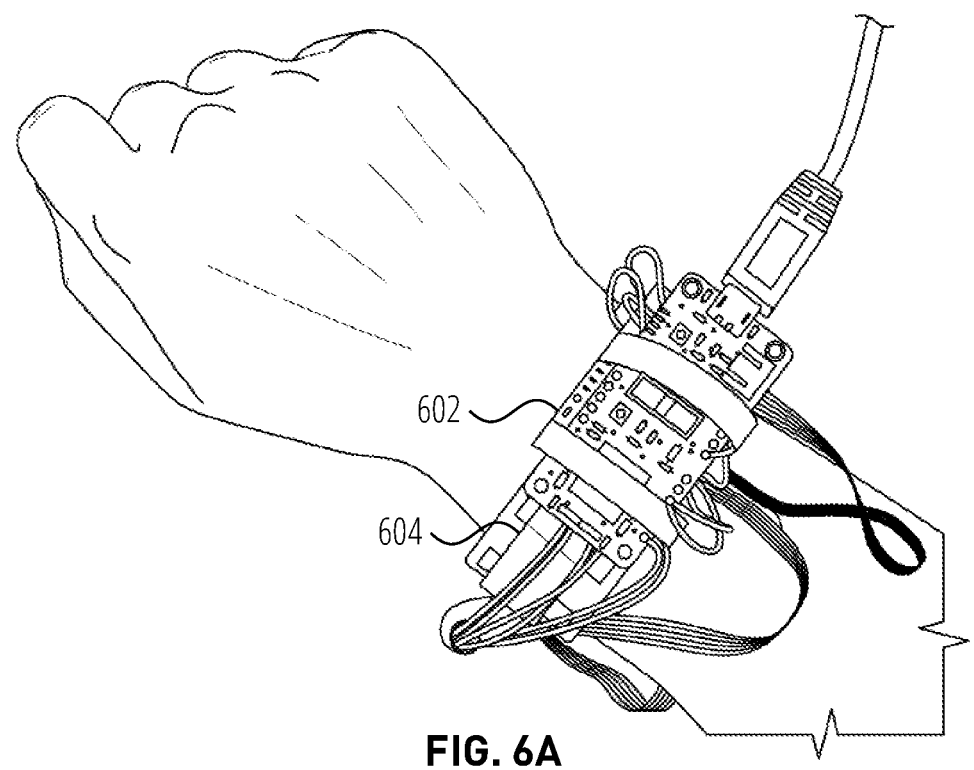
FIG. 6A, FIG. 6B, and FIG. 6C illustrate a wrist-worn XR input device incorporating components of a finger gesture recognition system in accordance with some examples of the present disclosure.
Figure 6B:
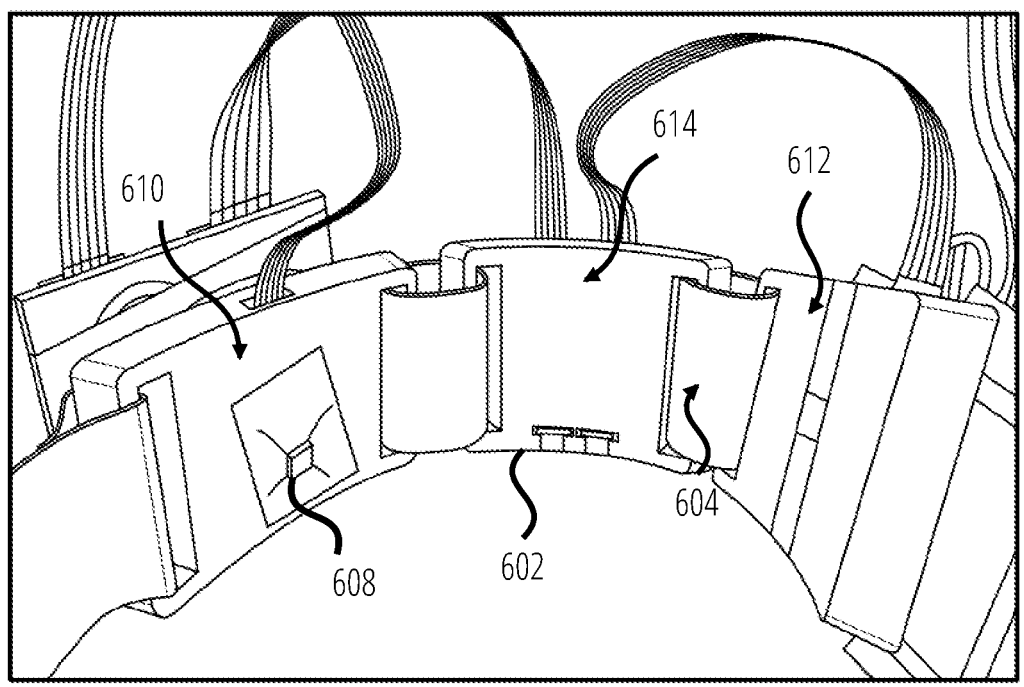
Figure 6C:
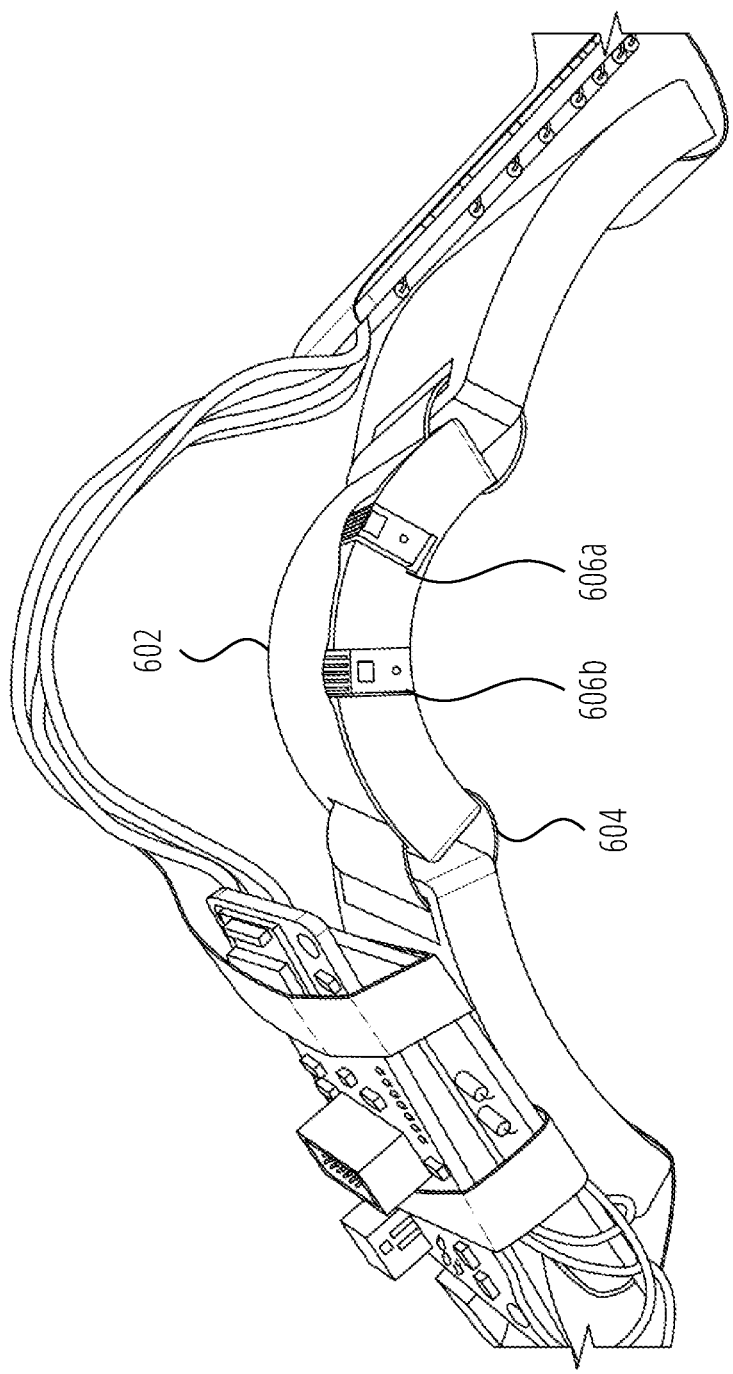

FIG. 6A, FIG. 6B, and FIG. 6C illustrate a wrist-worn XR input device incorporating components of a finger gesture recognition system in accordance with some examples of the present disclosure.

In some examples, a wrist-worn XR input device 602 comprises sensors carried by a wristband 604. The sensors include one or more optic sensors, such as optic sensor 606*a* and optic sensor 606*b* (modified PAJ7620U2) and one or more on-skin or contact audio sensors in contact with a wrist of a user such as a modified MEMS audio sensor 608. In some examples, the optic sensors are also imaging sensors capable of generating and communicating an image.

In some examples, a Bluetooth Low Energy (BLE) controller board (Adafruit Feather nRF52840 Express) is attached to capture data reported by the one or more audio sensors and the one or more optic sensors and communicate with XR devices that receive finger gesture inputs.

In some examples, the one or more audio sensors and the one or more optic sensors are soldered on Flexible Printed-Circuits (FPCs) for the flexible installation on the wristband 604.

In some examples, to secure a sensor mount and ensure the sensors are in specified positions in repeated wearing, a 3D-printed wristband skeleton is used. The wristband skeleton consists of discrete portions on respective wrist locations, i.e., a volar-wrist portion 610 (VP), a dorsal-wrist portion 612 (DP), and a radial-wrist portion 614 (RP). The three pieces are chained through elastic bands.

In some examples, wrist anatomy reveals that the volar wrist area is thinner and closer to the tendons that control finger gestures than the other two locations. Accordingly, an advantageous placement of the one or more audio sensors is on the volar-wrist portion 610 of the wristband for a better capture of a gesture-induced audio signal.

In some examples, an audio sensor comprises a COTS MEMS microphone encapsulated into a metal shell. However, given the small form factor of MEMS microphone, a contact area between the shell and a user's skin will be limited and tend to generate capacitance. Consequently, skin-coupling capacitance can disturb the MEMS microphone (as MEMS Mic leverages the inner capacitance to measure the sound pressure) and filtering capacitors on the FPC. In addition, a skin-coupling noise frequency band may overlap that of finger gesture audio signals, thereby being difficult to remove by signal filtering. To mitigate noise, a finger gesture recognition system includes a specifically designed z-shape slot on a volar-wrist portion of a wristband 604 for microphone installation. It can be seen that the capacitors of microphone can be positioned in a z-slot and are well isolated from skin surface.

In some examples, a thin metallic membrane is applied to the audio sensor 608 (e.g., aluminum foil) to help increase the contact area with skin to mitigate disturbing capacitances. Moreover, as the opening of microphone shell is covered by the metallic membrane, the audio signals from finger gestures may be further amplified by the formed metal drum.

In some examples, to minimize an influence of ambient light, a finger gesture recognition system's optic sensors work in an infrared spectrum and include an IR LED. For example, for each sensing frame, the IR LED first illuminates the sensing area and then dims. The illumination area is fine-tuned and limited to keep a low energy consumption. An optic sensor array captures a frame when the IR LED is on and captures a frame when the IR LED is off, respectively. Subtraction is then applied on the two adjacent frames to minimize possible IR noise from the environment and generate a single frame.

In some examples, an optic sensor captures multiple image frames per second and the finger gesture recognition system performs a subtraction between adjacent frames to get an optic sensor data flow that captures the dynamics of a moving object in front of the optic sensor. To detect an object in a field of view, the finger gesture recognition system applies a threshold on the raw image frame and selects the pixels above the threshold as valid pixels followed by a clustering algorithm to find out the largest cluster of bright pixels. The finger gesture recognition system uses a center of a cluster to represent an object location and convert a center pixel location to X/Y coordinate values. Object size is determined by a number of bright pixels and brightness is the sum of all the pixels.

In some examples, an optic sensor captures a shroud or dorsal surface of a thumb finger in a field of view of the optic sensor.

In some such examples, X/Y coordinates are used to define a position and motion of a thumb.

In some examples, a finger gesture recognition system uses two optic sensors with slightly different tilting angles to expand the field of view.

In some examples, a controller board of a finger gesture recognition system captures optic sensor and audio sensor readings by looping to keep all the sensors synchronized. The finger gestures that the finger gesture recognition system recognizes are sometimes fast (less than half a second) and the audio and optic sensing modalities are of different and high sensing rates.

In some examples, a finger gesture recognition system controller board accesses the optic sensors via I2C in a synchronized way as their sample rates are about the same and relatively low as compared to an audio sensor. As the audio sensor sends audio signals to the controller board via Pulse-Density Modulation (PDM) at a rate greater than a sampling rate of the optic sensors, the finger gesture recognition system enables asynchronized transmission for audio signals utilizing direct memory access with double-buffering. The interruption triggered by a buffer full event is minimized to reduce the influence on the loop duration. In some examples, the finger gesture recognition system configures the controller board to send a same amount data in each loop to keep the communication overhead consistent.

In some examples, a finger gesture recognition system augments an audio signal from an audio sensor by amplitude scaling, jitter noise reduction, time stretch, and/or pitch augmentation.

In some examples, a finger gesture recognition system applies a median filter on a raw audio signal generated by an audio sensor by filtering on the time domain, calculating a spectrogram of the audio signal to convert it into both frequency and time domain to capture richer information. For instance, the finger gesture recognition system uses a time window of 1024 samples with a stride of 80 samples for computing a power spectrogram density map. The finger gesture recognition system takes the log of the signal so that it can be more easily normalized. The finger gesture recognition system uses a min-max scaler to normalize the spectrogram. In some examples, a min and max are estimated from the whole dataset across all the users during training. After the audio signal pre-processing, the finger gesture recognition system operates on 2D vector as audio signal input.

In some examples, a finger gesture recognition system augments an optic signal generated by an optic sensor using time stretch, jitter reduction, and/or amplitude scaling.

In some examples, instead of using low resolution images directly from an optic sensor, a finger gesture recognition system uses on-chip computation and receives processed signals from raw images such as X/Y coordinates, object size, and brightness. Object detection and tracking algorithms are based on image processing techniques to minimize computation overhead of the main finger gesture recognition system.

In some examples, a finger gesture recognition system tracks objects in close range and thresholding/cluster-based object tracking algorithms are used.

In some examples, the finger gesture recognition system applies a median filter on the optic sensor data to filter out possible spike artifacts.

In some examples, to accommodate varying wearing positions, the finger gesture recognition system subtracts raw X/Y values by a mean value. The finger gesture recognition system normalizes the values by dividing the values by a fixed range, which is a maximum possible moving distance range estimated from all training datasets. This normalization retains the amplitude of the gesture and is agnostic to the wearing position.

In some examples, finger gesture recognition system utilizes signals from two optic sensor [X1, Y1, X2, Y2] as input to a multi-model finger gesture recognition component.

Figure 7A:
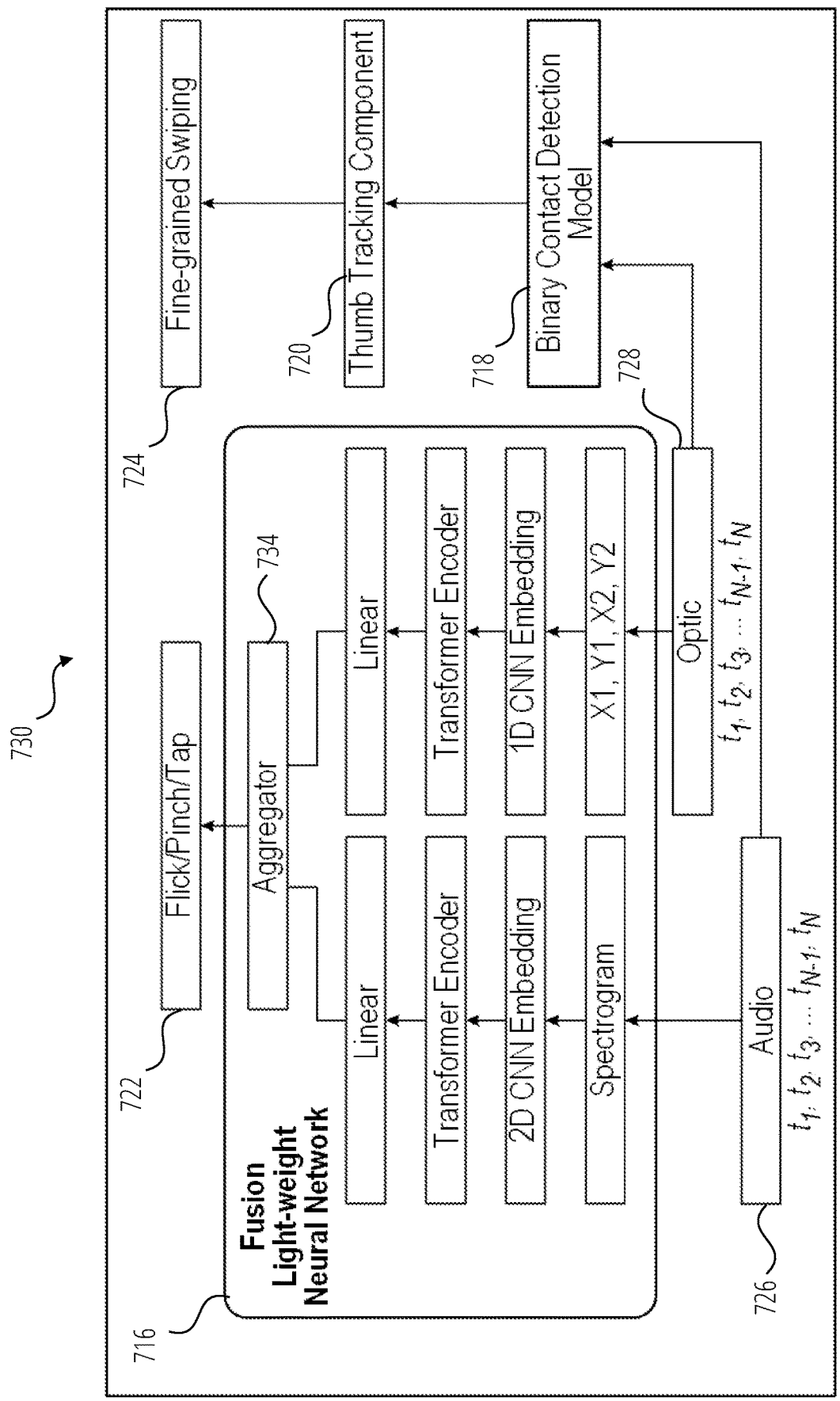
FIG. 7A illustrates a multi-modal finger gesture recognition component and FIG. 7B illustrates a method of operation of a finger gesture recognition system in accordance with some examples.
Figure 7B:
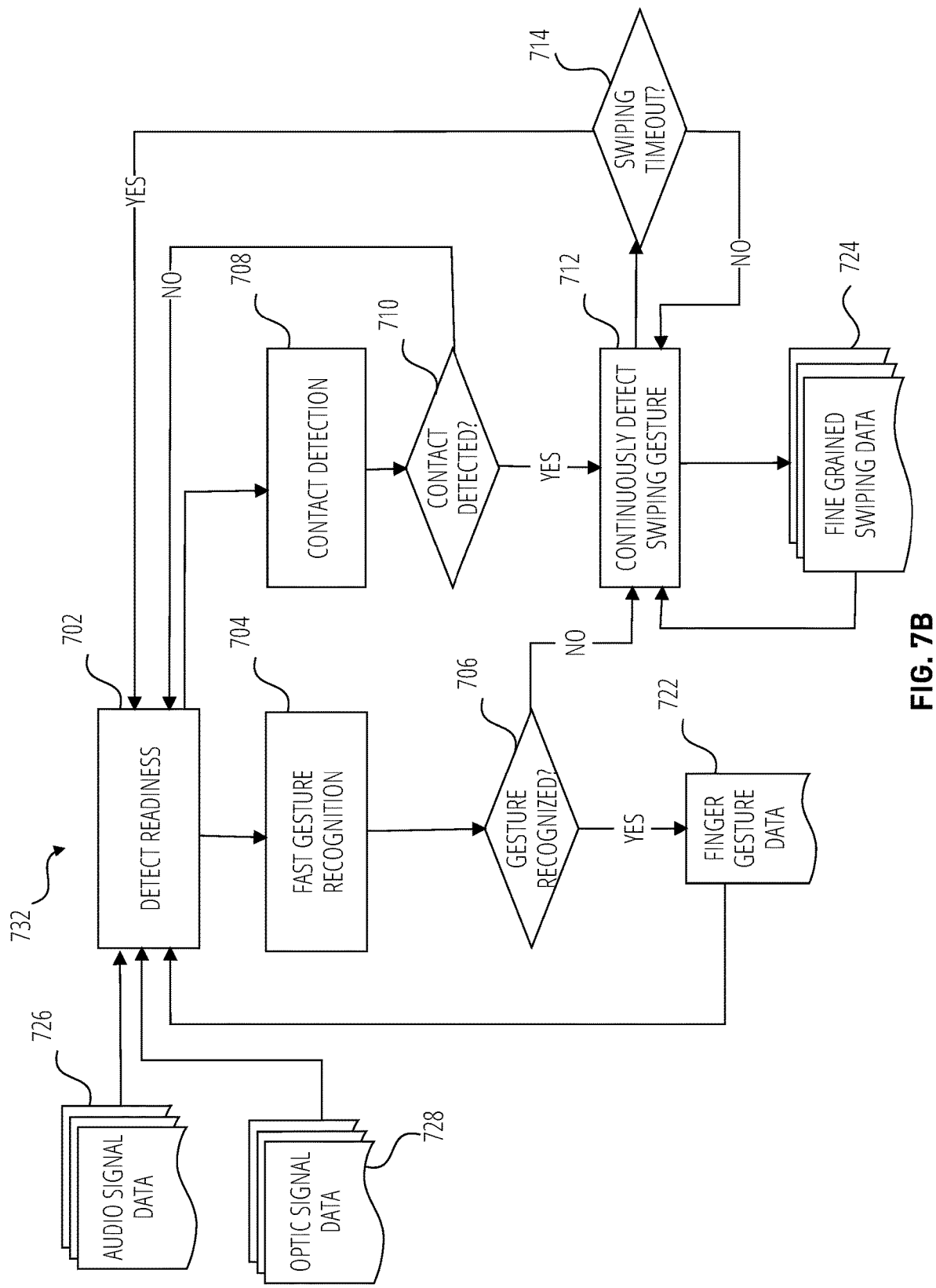

FIG. 7A illustrates a multi-modal finger gesture recognition component and FIG. 7B illustrates a method of operation of a finger gesture recognition system in accordance with some examples of the present disclosure. A finger gesture recognition system uses a finger gesture recognition component 730 to recognize finger gestures. The finger gesture recognition component 730 receives audio signal data 726 from one or more audio sensors and optic signal data 728 from one or more optic sensors, and recognizes finger gesture data 722 gestures and determines fine grained swiping data 724 movements based on the audio signal data 726 and the optic signal data 728.

In some examples, to achieve robust results and provide fine-grained gesture detection such as the distance swiped to the left or right, multiple models are used to detect and recognize finger gestures. In some examples, two models are used and the finger gesture recognition component 730 aggregates the results with logic. For instance, the finger gesture recognition component 730 uses a gesture classification model 716 for fast, non-continuous gestures to detect finger gesture data 722 gestures; and another contact binary detection model 718 to detect a thumb/index finger contact status. If contact is detected, the finger gesture recognition component 730 determines fine grained swiping data 724 movements for fine-grained control using a thumb tracking component 720.

In some examples, during model training, raw gesture samples are generated and then positive and negative samples are extracted online during training. Start and end positions of each performed gesture are labeled on synchronized audio-optic data precisely following a labelling guideline. For each gesture sample, a signal segment of 3 seconds is cropped with the sample in the middle of the whole segment. In some examples, samples are randomly cropped while ensuring 80% of a sample gesture signal is covered for swipe gestures, while full gesture signals are covered for fast motion gesture samples.

In some examples, a CNN-Transformer based model is designed and trained to classify signal sequences to gestures. The model takes audio and optic signals as multi-modal input and classifies the gestures.

In some examples, for fast gesture recognition, the finger gesture recognition system uses a two stream CNN model without self-attention transformer encoders as a baseline.

In some examples, for slow gesture recognition (swipe left and swipe right) detection a similar classifier as a fast gesture detection model is trained. Such model outputs binary results such as left or right with no continuous fine-grained thumb tracking.

In some examples, a finger gesture recognition system uses optic sensors that produce raw object movement coordinates in pixels. The finger gesture recognition system can directly leverage such measurements for fine-grained control. A challenge is that without knowing if the thumb is contacting the index finger, the signal will be noisy as an optic sensor may not detect whether the user's thumb is contacting the user's index finger. Thus, the finger gesture recognition system detects thumb and finger contact so that the finger gesture recognition system can filter out the movements when the thumb is moving in the air. To achieve this goal, another neural network for detecting the contact is trained.

In some examples, audio signals are used to detect contact between a user's thumb and the user's finger. When the thumb is rubbed against an index finger, the resulting sound can be captured by an audio sensor of a finger gesture recognition system which gives the finger gesture recognition system an opportunity to identify the thumb to index finger contact. Thumb movements in the air without contacting the index finger also generate non-trivial sound signals. Thus, a sophisticated machine leaning model is used. We reuse a similar CNN-Transformer model without an optic branch and modify the output as a binary classifier.

In some examples, audio and optic signals are used to detect contact between the user's thumb and the user's fore finger.

In some examples, an aggregator 734 is used to aggregate the output from the gesture classification model 716. For example, aggregation is performed via a finite state machine (FSM). The state transition from the current gesture i to a new gesture j will be triggered when ti j-consecutive windows are predicted to be of the gesture j. Therefore, the gesture transition matrix as ti j, i, j∈G, where G is the states set of all gestures including the state where no gesture is presented. Considering the gestures are usually mapped to atomic input operation, transitions between two gestures are disabled, i.e., only transitions between the non-gesture state and gesture state are allowed. In this way, aggregation is controlled by a limited set of parameters.

In some examples, the number of correct gestures as our target function to optimize the ten aggregation parameters. A correctly recognized gesture includes the gestures with which the recognition is perfectly matched or partially matched. As the solution space is large, a random search is used to approximate an optimal solution. The optimization is performed on dedicated data and the results are reported on unseen data.

In some examples, a finger gesture recognition system captures two streams of audio signal data at 41667 Hz and two streams of optic signal data at 368 fps, including X/Y coordinates, object size and brightness.

FIG. 7B is an illustration of a finger gesture recognition process 732 in accordance with some examples of the present disclosure. The finger gesture recognition process 732 is used by a finger gesture recognition system to recognize finger gestures being made by a user by using the finger gesture recognition component 730.

In operation 702, the finger gesture recognition system detects a readiness to recognize finger gestures being made by a user by polling one or more audio sensors and one or more optic sensors for signal data. The finger gesture recognition system uses the one or more optic sensors and the one or more audio sensors to capture optically detectable finger gesture components and audibly detectable finger gesture components, respectively, of finger gesture movements being made by a user while the user interacts with an XR application. The one or more optic sensors 404 generate optic signal data 728 and communicates the optic signal data 728 to the finger gesture recognition system. The one or more audio sensors generate audio signal data 726 and communicate the audio signal data 726 to the finger gesture recognition system.

In operation 704, if the finger gesture recognition system has detected that the finger gesture recognition system is ready in operation 702, the finger gesture recognition system attempts to recognize a fast finger gesture being made by the user based on the audio signal data 726 and the optic signal data 728 using the gesture classification model 716 of the finger gesture recognition component 730.

In operation 706, the finger gesture recognition system determines whether a fast finger gesture has been recognized in operation 704. If a fast finger gesture has been recognized, the finger gesture recognition system communicates finger gesture data 722 to the XR application and returns to operation 702.

If in operation 706 the finger gesture recognition system determines that a fast finger gesture has not been recognized in operation 704, the finger gesture recognition system transitions to operation 712.

In operation 712, the finger gesture recognition system continuously detects swiping finger gestures being made by the user by using the thumb tracking component 720 of the finger gesture recognition component 730. The finger gesture recognition system communicates fine grained swiping data 724 generated by the thumb tracking component 720 to the XR application.

During operation 712, a timeout timer (not shown) of the thumb tracking component 720 continuously monitors the operations of the thumb tracking component 720 and signals swiping timeout when there are no more swiping finger gestures being made by the user. In operation 714, if the timeout timer of the thumb tracking component 720 signals a swiping timeout, the finger gesture recognition system transitions to operation 702. If in operation 714, the timeout timer of the thumb tracking component 720 does not signal a swiping timeout, the finger gesture recognition system continues detecting swiping finger gestures in operation 712.

Simultaneously with operation 704, in operation 708 the finger gesture recognition system attempts to detect contact between a thumb and finger of the user based on the audio signal data 726 using the contact binary detection model 718 of the thumb tracking component 720.

In operation 710, the finger gesture recognition system determines whether contact is being made between a thumb and finger of the user. If contact is not being made, the finger gesture recognition system transitions to operation 702. If contact is being made, the finger gesture recognition system transitions to operation 712.

As described above, in operation 712, the finger gesture recognition system continuously detects swiping finger gestures being made by the user by using the thumb tracking component 720 of the finger gesture recognition component 730. The finger gesture recognition system communicates fine grained swiping data 724 generated by the thumb tracking component 720 to the XR application.

During operation 712, a timeout timer (not shown) of the thumb tracking component 720 continuously monitors the operations of the thumb tracking component 720 and signals swiping timeout when there are no more swiping finger gestures being made by the user. In operation 714, if the timeout timer of the thumb tracking component 720 signals a swiping timeout, the finger gesture recognition system transitions to operation 702. If in operation 714, the timeout timer of the thumb tracking component 720 does not signal a swiping timeout, the finger gesture recognition system continues detecting swiping finger gestures in operation 712.

Figure 8:
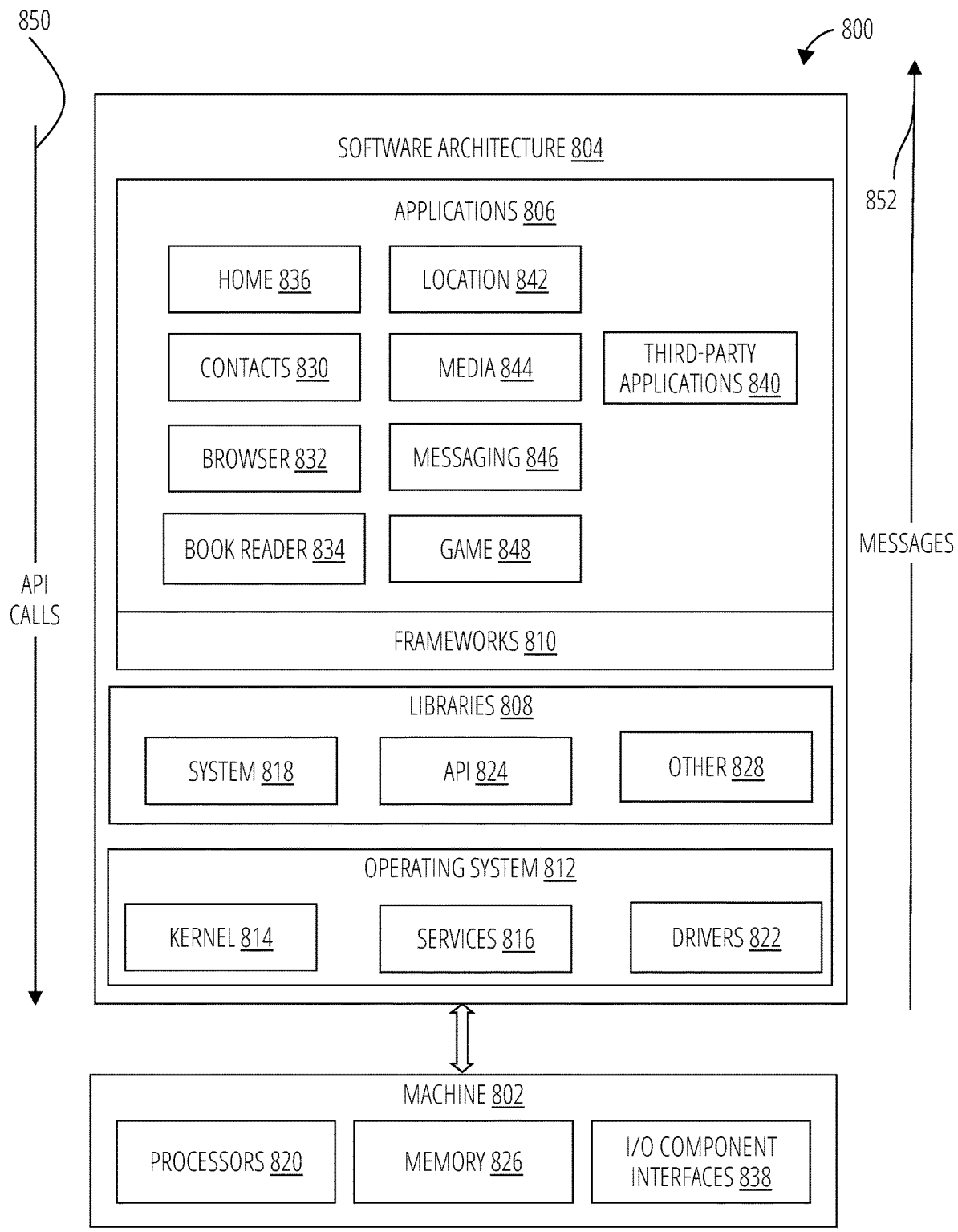
FIG. 8 is a block diagram showing a software architecture within which the present disclosure may be implemented, in accordance with some examples.

FIG. 8 is a block diagram 800 illustrating a software architecture 804, which can be installed on any one or more of the devices described herein. The software architecture 804 is supported by hardware such as a machine 802 that includes processors 820, memory 826, and I/O component interfaces 838. In this example, the software architecture 804 can be conceptualized as a stack of layers, where individual layers provide a particular functionality. The software architecture 804 includes layers such as an operating system 812, libraries 808, frameworks 810, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 808 provide a low-level common infrastructure used by the applications 806. The libraries 808 can include system libraries 818 (e.g., C standard library) that provide functions such as memory allocation functions, string manipulation functions, mathematic functions, and the like. In addition, the libraries 808 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 808 can also include a wide variety of other libraries 828 to provide many other APIs to the applications 806.

The frameworks 810 provide a high-level common infrastructure that is used by the applications 806. For example, the frameworks 810 provide various graphical user interface (GUI) functions, high-level resource management, and high-level location services. The frameworks 810 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

Figure 9:
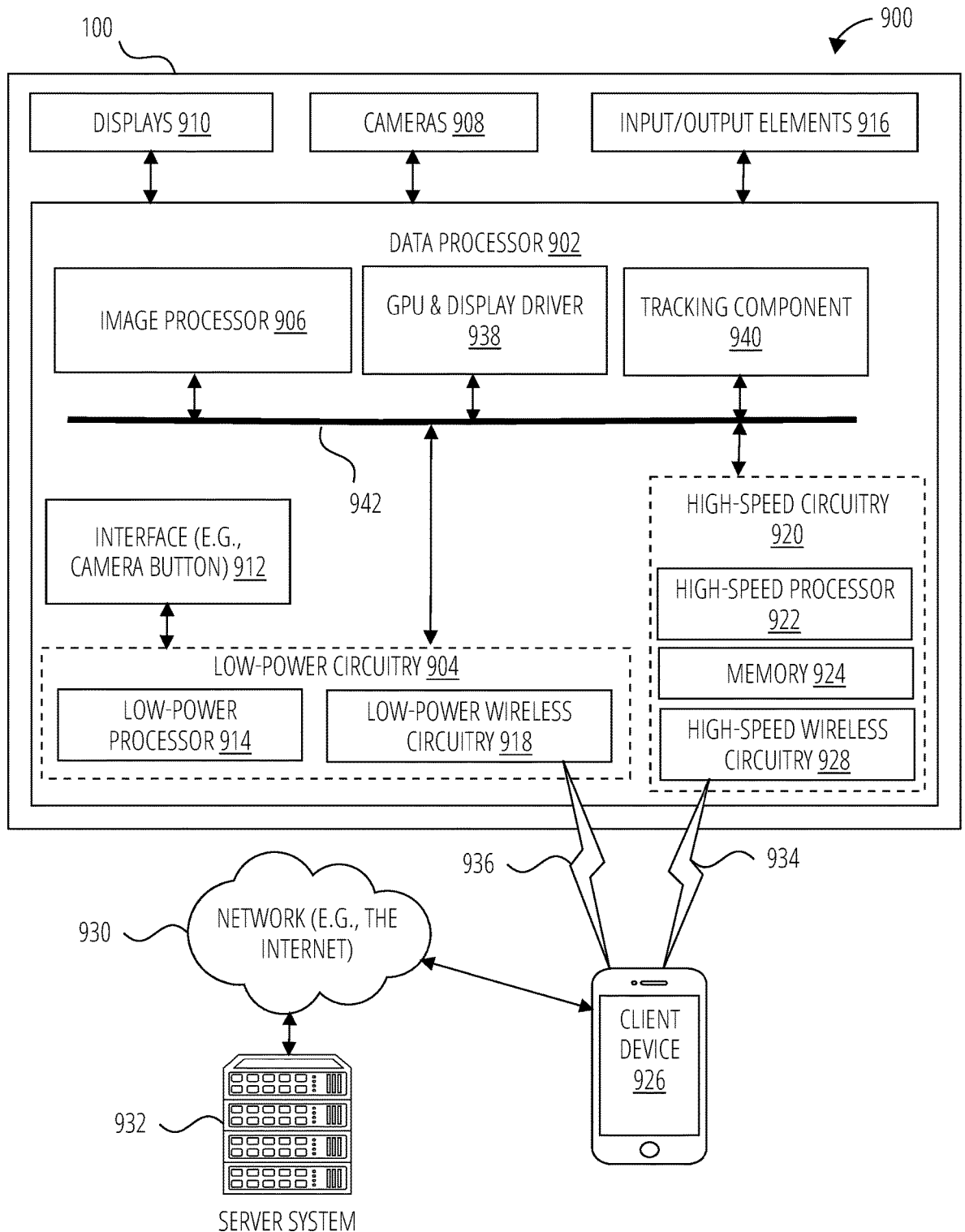
FIG. 9 is a block diagram illustrating a networked system including details of a head-worn AR system, in accordance with some examples.

FIG. 9 is a block diagram illustrating a networked system 900 including details of the glasses 100, in accordance with some examples. The networked system 900 includes the glasses 100, a client device 926, and a server system 932. The client device 926 may be a smartphone, tablet, phablet, laptop computer, access point, or any other such device capable of connecting with the glasses 100 using a low-power wireless connection 936 and/or a high-speed wireless connection 934. The client device 926 is connected to the server system 932 via the network 930. The network 930 may include any combination of wired and wireless connections. The server system 932 may be one or more computing devices as part of a service or network computing system. The client device 926 and any elements of the server system 932 and network 930 may be implemented using details of the software architecture 804 or the machine 300 described in FIG. 8 and FIG. 3 respectively.

The glasses 100 include a data processor 902, displays 910, one or more cameras 908, and additional input/output elements 916. The input/output elements 916 may include microphones, audio speakers, biometric sensors, additional sensors, or additional display elements integrated with the data processor 902. Examples of the input/output elements 916 are discussed further with respect to FIG. 8 and FIG. 3. For example, the input/output elements 916 may include any of I/O device interfaces 306 including output component interfaces 328, motion component interfaces 336, and so forth. Examples of the displays 910 are discussed in FIG. 2. In the particular examples described herein, the displays 910 include a display for the user's left and right eyes.

The data processor 902 includes an image processor 906 (e.g., a video processor), a GPU & display driver 938, a tracking component 940, an interface 912, low-power circuitry 904, and high-speed circuitry 920. The components of the data processor 902 are interconnected by a bus 942.

The interface 912 refers to any source of a user command that is provided to the data processor 902. In one or more examples, the interface 912 is a physical button that, when depressed, sends a user input signal from the interface 912 to a low-power processor 914. A depression of such button followed by an immediate release may be processed by the low-power processor 914 as a request to capture a single image, or vice versa. A depression of such a button for a first period of time may be processed by the low-power processor 914 as a request to capture video data while the button is depressed, and to cease video capture when the button is released, with the video captured while the button was depressed stored as a single video file. Alternatively, depression of a button for an extended period of time may capture a still image. In some examples, the interface 912 may be any mechanical switch or physical interface capable of accepting user inputs associated with a request for data from the cameras 908. In other examples, the interface 912 may have a software component, or may be associated with a command received wirelessly from another source, such as from the client device 926.

The image processor 906 includes circuitry to receive signals from the cameras 908 and process those signals from the cameras 908 into a format suitable for storage in the memory 924 or for transmission to the client device 926. In one or more examples, the image processor 906 (e.g., video processor) comprises a microprocessor integrated circuit (IC) customized for processing sensor data from the cameras 908, along with volatile memory used by the microprocessor in operation.

The low-power circuitry 904 includes the low-power processor 914 and the low-power wireless circuitry 918. These elements of the low-power circuitry 904 may be implemented as separate elements or may be implemented on a single IC as part of a system on a single chip. The low-power processor 914 includes logic for managing the other elements of the glasses 100. As described above, for example, the low-power processor 914 may accept user input signals from the interface 912. The low-power processor 914 may also be configured to receive input signals or instruction communications from the client device 926 via the low-power wireless connection 936. The low-power wireless circuitry 918 includes circuit elements for implementing a low-power wireless communication system. Bluetooth™ Smart, also known as Bluetooth™ low energy, is one standard implementation of a low power wireless communication system that may be used to implement the low-power wireless circuitry 918. In other examples, other low power communication systems may be used.

The high-speed circuitry 920 includes a high-speed processor 922, a memory 924, and a high-speed wireless circuitry 928. The high-speed processor 922 may be any processor capable of managing high-speed communications and operation of any general computing system used for the data processor 902. The high-speed processor 922 includes processing resources used for managing high-speed data transfers on the high-speed wireless connection 934 using the high-speed wireless circuitry 928. In some examples, the high-speed processor 922 executes an operating system such as a LINUX operating system or other such operating system such as the operating system 812 of FIG. 8. In addition to any other responsibilities, the high-speed processor 922 executing a software architecture for the data processor 902 is used to manage data transfers with the high-speed wireless circuitry 928. In some examples, the high-speed wireless circuitry 928 is configured to implement Institute of Electrical and Electronic Engineers (IEEE) 802.11 communication standards, also referred to herein as Wi-Fi. In other examples, other high-speed communications standards may be implemented by the high-speed wireless circuitry 928.

The memory 924 includes any storage device capable of storing camera data generated by the cameras 908 and the image processor 906. While the memory 924 is shown as integrated with the high-speed circuitry 920, in other examples, the memory 924 may be an independent stand-alone element of the data processor 902. In some such examples, electrical routing lines may provide a connection through a chip that includes the high-speed processor 922 from image processor 906 or the low-power processor 914 to the memory 924. In other examples, the high-speed processor 922 may manage addressing of the memory 924 such that the low-power processor 914 will boot the high-speed processor 922 any time that a read or write operation involving the memory 924 is desired.

The tracking component 940 estimates a pose of the glasses 100. For example, the tracking component 940 uses image data and associated inertial data from the cameras 908 and the position component interfaces 340, as well as GPS data, to track a location and determine a pose of the glasses 100 relative to a frame of reference (e.g., real-world scene environment). The tracking component 940 continually gathers and uses updated sensor data describing movements of the glasses 100 to determine updated three-dimensional poses of the glasses 100 that indicate changes in the relative position and orientation relative to physical objects in the real-world scene environment. The tracking component 940 permits visual placement of virtual objects relative to physical objects by the glasses 100 within the field of view of the user via the displays 910.

The GPU & display driver 938 may use the pose of the glasses 100 to generate frames of virtual content or other content to be presented on the displays 910 when the glasses 100 are functioning in a traditional augmented reality mode. In this mode, the GPU & display driver 938 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 926, or on a remote server. For example, one or more functions or operations described herein may be performed by one of the applications 806 such as messaging application 846.

Figure 10:
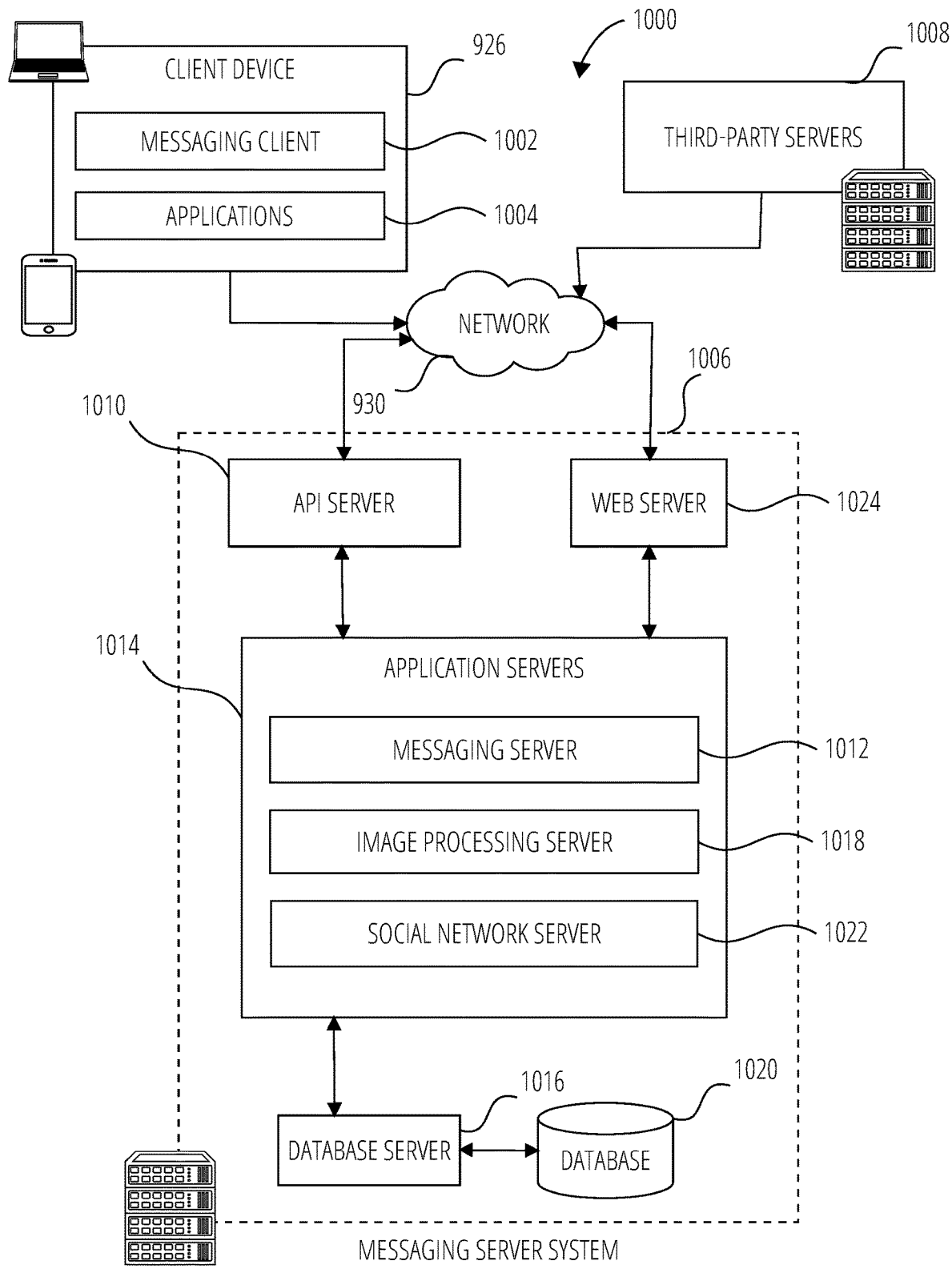
FIG. 10 is a block diagram showing an example messaging system for exchanging data (e.g., messages and associated content) over a network in accordance with some examples.

FIG. 10 is a block diagram showing an example messaging system 1000 for exchanging data (e.g., messages and associated content) over a network. The messaging system 1000 includes multiple instances of a client device 926 which host a number of applications, including a messaging client 1002 and other applications 1004. A messaging client 1002 is communicatively coupled to other instances of the messaging client 1002 (e.g., hosted on respective other client devices 926), a messaging server system 1006 and third-party servers 1008 via a network 930 (e.g., the Internet). A messaging client 1002 can also communicate with locally hosted applications 1004 using Application Program Interfaces (APIs).

A messaging client 1002 is able to communicate and exchange data with other messaging clients 1002 and with the messaging server system 1006 via the network 930. The data exchanged between messaging clients 1002, and between a messaging client 1002 and the messaging server system 1006, includes functions (e.g., commands to invoke functions) as well as payload data (e.g., text, audio, video or other multimedia data).

The messaging server system 1006 provides server-side functionality via the network 930 to a particular messaging client 1002. While some functions of the messaging system 1000 are described herein as being performed by either a messaging client 1002 or by the messaging server system 1006, the location of some functionality either within the messaging client 1002 or the messaging server system 1006 may be a design choice. For example, it may be technically preferable to initially deploy some technology and functionality within the messaging server system 1006 but to later migrate this technology and functionality to the messaging client 1002 where a client device 926 has sufficient processing capacity.

The messaging server system 1006 supports various services and operations that are provided to the messaging client 1002. Such operations include transmitting data to, receiving data from, and processing data generated by the messaging client 1002. This data may include message content, client device information, geolocation information, media augmentation and overlays, message content persistence conditions, social network information, and live event information, as examples. Data exchanges within the messaging system 1000 are invoked and controlled through functions available via user interfaces (UIs) of the messaging client 1002.

Turning now specifically to the messaging server system 1006, an Application Program Interface (API) server 1010 is coupled to, and provides a programmatic interface to, application servers 1014. The application servers 1014 are communicatively coupled to a database server 1016, which facilitates access to a database 1020 that stores data associated with messages processed by the application servers 1014. Similarly, a web server 1024 is coupled to the application servers 1014, and provides web-based interfaces to the application servers 1014. To this end, the web server 1024 processes incoming network requests over the Hypertext Transfer Protocol (HTTP) and several other related protocols.

The Application Program Interface (API) server 1010 receives and transmits message data (e.g., commands and message payloads) between the client device 926 and the application servers 1014. Specifically, the Application Program Interface (API) server 1010 provides a set of interfaces (e.g., routines and protocols) that can be called or queried by the messaging client 1002 in order to invoke functionality of the application servers 1014. The Application Program Interface (API) server 1010 exposes various functions supported by the application servers 1014, including account registration, login functionality, the sending of messages, via the application servers 1014, from a particular messaging client 1002 to another messaging client 1002, the sending of media files (e.g., images or video) from a messaging client 1002 to a messaging server 1012, and for possible access by another messaging client 1002, the settings of a collection of media data (e.g., story), the retrieval of a list of friends of a user of a client device 926, the retrieval of such collections, the retrieval of messages and content, the addition and deletion of entities (e.g., friends) to an entity graph (e.g., a social graph), the location of friends within a social graph, and opening an application event (e.g., relating to the messaging client 1002).

The application servers 1014 host a number of server applications and subsystems, including for example a messaging server 1012, an image processing server 1018, and a social network server 1022. The messaging server 1012 implements a number of message processing technologies and functions, particularly related to the aggregation and other processing of content (e.g., textual and multimedia content) included in messages received from multiple instances of the messaging client 1002. As will be described in further detail, the text and media content from multiple sources may be aggregated into collections of content (e.g., called stories or galleries). These collections are then made available to the messaging client 1002. Other processor and memory intensive processing of data may also be performed server-side by the messaging server 1012, in view of the hardware requirements for such processing.

The application servers 1014 also include an image processing server 1018 that is dedicated to performing various image processing operations, typically with respect to images or video within the payload of a message sent from or received at the messaging server 1012.

The social network server 1022 supports various social networking functions and services and makes these functions and services available to the messaging server 1012. To this end, the social network server 1022 maintains and accesses an entity graph within the database 1020. Examples of functions and services supported by the social network server 1022 include the identification of other users of the messaging system 1000 with which a particular user has relationships or is "following," and also the identification of other entities and interests of a particular user.

The messaging client 1002 can notify a user of the client device 926, or other users related to such a user (e.g., "friends"), of activity taking place in shared or shareable sessions. For example, the messaging client 1002 can provide participants in a conversation (e.g., a chat session) in the messaging client 1002 with notifications relating to the current or recent use of a game by one or more members of a group of users. One or more users can be invited to join in an active session or to launch a new session. In some examples, shared sessions can provide a shared augmented reality experience in which multiple people can collaborate or participate.

Additional examples include:

Example 1 is a method comprising: capturing, by one or more processors, using one or more audio sensors, audio signal data of a finger gesture being made by a user; capturing, by the one or more processors, using one or more optic sensors, optic signal data of the finger gesture; recognizing, by the one or more processors, the finger gesture based on the audio signal data and the optic signal data; and communicating, by the one or more processors, finger gesture data of the recognized finger gesture to an XR application.

In Example 2, the subject matter of Example 1 includes, wherein the one or more audio sensors are mounted on a volar-wrist portion of a wrist-worn input device.

In Example 3, the subject matter of any of Examples 1-2 includes, wherein the one or more optic sensors are mounted on a radial-wrist portion of a wrist-worn input device.

In Example 4, the subject matter of any of Examples 1-3 includes, wherein the recognizing the finger gesture based on the audio signal data and the optic signal data further comprises: recognizing the finger gesture using a gesture classification model.

In Example 5, the subject matter of any of Examples 1-4 includes, wherein recognizing the finger gesture based on the audio signal data and the optic signal data further comprises: detecting that a thumb of the user is contacting a finger of the user based on the audio signal data using a binary detection model.

In Example 6, the subject matter of any of Examples 1-5 includes, wherein recognizing the finger gesture based on the audio signal data and the optic signal data further comprises: determining a swiping finger gesture based on the optic signal data using a thumb tracking component.

In Example 7, the subject matter of any of Examples 1-6 includes, wherein recognizing the finger gesture based on the audio signal data and the optic signal data further comprises: aggregating output of a gesture classification model used to recognize the finger gesture using a finite state machine.

Example 8 is at least one machine-readable medium including instructions that, when executed by processing circuitry, cause the processing circuitry to perform operations to implement of any of Examples 1-7.

Example 9 is an apparatus comprising means to implement of any of Examples 1-7.

Example 10 is a system to implement of any of Examples 1-7.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "machine-readable medium" refers to both machine-storage media and transmission media. Thus, the terms include both storage devices/media and carrier waves/modulated data signals. The terms "machine-readable medium," "machine-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers)

that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A system comprising:
    one or more audio sensors;
    one or more optic sensors;
    one or more processors operably connected to the one or more audio sensors and the one or more optic sensors; and
    one or more memories operably connected to the one or more processors, the one or more memories storing instruction that when executed by the one or more processors cause the system to perform operations comprising:
        capturing, using the one or more audio sensors, audio signal data of a finger gesture being made by a user;
        capturing, using the one or more optic sensors, optic signal data of the finger gesture;
        recognizing the finger gesture based on the audio signal data and the optic signal data; and
        communicating finger gesture data of the recognized finger gesture to an Extended Reality (XR) application.

2. The system of claim 1, wherein the one or more audio sensors are mounted on a volar-wrist portion of a wrist-worn input device.

3. The system of claim 1, wherein the one or more optic sensors are mounted on a radial-wrist portion of a wrist-worn input device.

4. The system of claim 1, wherein the recognizing the finger gesture based on the audio signal data and the optic signal data further comprises:
    recognizing the finger gesture using a gesture classification model.

5. The system of claim 1, wherein recognizing the finger gesture based on the audio signal data and the optic signal data further comprises:
    detecting that a thumb of the user is contacting a finger of the user based on the audio signal data using a binary detection model.

6. The system of claim 5, wherein recognizing the finger gesture based on the audio signal data and the optic signal data further comprises:
    determining a swiping finger gesture based on the optic signal data using a thumb tracking component.

7. The system of claim 1, wherein recognizing the finger gesture based on the audio signal data and the optic signal data further comprises:
    aggregating output of a gesture classification model used to recognize the finger gesture using a finite state machine.

8. A method comprising:
    capturing, by one or more processors, using one or more audio sensors, audio signal data of a finger gesture being made by a user;
    capturing, by the one or more processors, using one or more optic sensors, optic signal data of the finger gesture;
    recognizing, by the one or more processors, the finger gesture based on the audio signal data and the optic signal data; and
    communicating, by the one or more processors, finger gesture data of the recognized finger gesture to an XR application.

9. The method of claim 8, wherein the one or more audio sensors are mounted on a volar-wrist portion of a wrist-worn input device.

10. The method of claim 8, wherein the one or more optic sensors are mounted on a radial-wrist portion of a wrist-worn input device.

11. The method of claim 8, wherein the recognizing the finger gesture based on the audio signal data and the optic signal data further comprises:
    recognizing the finger gesture using a gesture classification model.

12. The method of claim 8, wherein recognizing the finger gesture based on the audio signal data and the optic signal data further comprises:
    detecting that a thumb of the user is contacting a finger of the user based on the audio signal data using a binary detection model.

13. The method of claim 8, wherein recognizing the finger gesture based on the audio signal data and the optic signal data further comprises:
   determining a swiping finger gesture based on the optic signal data using a thumb tracking component.

14. The method of claim 8, wherein recognizing the finger gesture based on the audio signal data and the optic signal data further comprises:
   aggregating output of a gesture classification model used to recognize the finger gesture using a finite state machine.

15. A computer-storage medium storing instructions that when executed by a computer, cause the computer to perform operations comprising:
   capturing, using one or more audio sensors, audio signal data of a finger gesture being made by a user;
   capturing, using one or more optic sensors, optic signal data of the finger gesture;
   recognizing the finger gesture based on the audio signal data and the optic signal data; and
   communicating finger gesture data of the recognized finger gesture to an XR application.

16. The computer-storage medium of claim 15, wherein the one or more audio sensors are mounted on a volar-wrist portion of a wrist-worn input device.

17. The computer-storage medium of claim 15, wherein the one or more optic sensors are mounted on a radial-wrist portion of a wrist-worn input device.

18. The computer-storage medium of claim 15, wherein the recognizing the finger gesture based on the audio signal data and the optic signal data further comprises:
   recognizing the finger gesture using a gesture classification model.

19. The computer-storage medium of claim 15, wherein recognizing the finger gesture based on the audio signal data and the optic signal data further comprises:
   detecting that a thumb of the user is contacting a finger of the user based on the audio signal data using a binary detection model.

20. The computer-storage medium of claim 15, wherein recognizing the finger gesture based on the audio signal data and the optic signal data further comprises:
   determining a swiping finger gesture based on the optic signal data using a thumb tracking component.

* * * * *